United States Patent [19]
Kondo et al.

[11] Patent Number: 5,475,675
[45] Date of Patent: Dec. 12, 1995

[54] APPARATUS AND METHOD FOR NON-STOP SWITCHING IN ASYNCHRONOUS TRANSFER MODE

[75] Inventors: Ryuichi Kondo; Haruo Yamashita; Tomohiro Ishihara; Toshiyuki Sudo; Takaaki Wakisaka, all of Kawasaki, Japan

[73] Assignees: Fujitsu Limited, Kawasaki; Nippon Telegraph and Telephone Corporation, Tokyo

[21] Appl. No.: 850,829

[22] Filed: Mar. 13, 1992

[30] Foreign Application Priority Data

Mar. 15, 1991 [JP] Japan ................... 3-049990

[51] Int. Cl.$^6$ .................................................. H04J 1/16
[52] U.S. Cl. ........................ 370/16; 370/94.1; 340/827
[58] Field of Search ........................ 370/16, 13, 94.1, 370/601, 60.1; 340/825.01, 825.02, 827; 371/8.1, 8.2, 11.1, 11.2

[56] References Cited

U.S. PATENT DOCUMENTS

| | | | |
|---|---|---|---|
| 4,831,617 | 5/1989 | Iwasaki | 370/16 |
| 5,072,440 | 12/1991 | Isono et al. | 370/16 |
| 5,153,578 | 10/1992 | Izawa et al. | 370/16 |
| 5,166,926 | 11/1992 | Cisneros et al. | 370/94.1 |

OTHER PUBLICATIONS

Patent Abstracts of Japan, vol. 14, No. 67 (E–885), Feb. 7, 1990 & JP-A-1 286645, Nov. 17, 1989.
Patent Abstracts of Japan, vol. 14, No. 38 (E–878), Jan. 24, 1990 & JP-A-1 270427, Oct. 27, 1989.
Patent Abstracts of Japan, vol. 14, No. 483 (E–0993), Mar. 31, 1990 & JP-A-2 200038, Aug. 8, 1990.
Patent Abstracts of Japan, vol. 12, No. 99 (E–594), Mar. 31, 1988 & JP-A-62 230138, Oct. 8, 1987.

*Primary Examiner*—Douglas W. Olms
*Assistant Examiner*—Dang Ton
*Attorney, Agent, or Firm*—Staas & Halsey

[57] ABSTRACT

According to the present invention, when a current system is switched to a spare system in a transmission system in an asynchronous transfer mode, empty cells transmitted in the current and spare systems are detected, and thereby a timing for switching the current system to the spare system is determined. When no phase difference is existent between the current and spare systems, an empty cell is detected in both the current and spare systems at the same time. Therefore, the current system is switched to the spare system, when an empty cell is detected in both the current and spare systems at the same time. When a shade difference is existent, if an empty cell is detected either in the current or spare systems, another empty cell is inserted in to the systems. Then, the data of the empty cell in a spare system is saved. After the empty cell in a current system passes, the current system is switched to the spare system. When a phase difference of at least one cell is existent, and if an empty cell comes earlier in current system, empty cell are kept inserted form when the empty cell is detected in the current system until an empty cell is detected in the spare system. After that, the current system is switched to the spare system. When an empty cell comes earlier in a spare system, the data of the cell in the spare system is saved from when the empty cell is detected until an empty cell is detected in the current system. After that, the current system is switched to the spare system.

10 Claims, 6 Drawing Sheets

APPARATUS AND METHOD FOR NON-STOP SWITCHING IN ASYNCHRONOUS TRANSFER MODE

BACKGROUND OF THE INVENTION

1. Field of the Invention

The present invention relates to an apparatus and a method for non-stop switching of a signal from a current system to a spare system under a PCM transmission system. More particularly, this invention is concerned with an apparatus and a method for non-stop switching in which the digital network is duplicated to ensure instantaneous switching when a fault occurs.

A method called asynchronous transfer mode (hereafter, ATM) has been proposed as a technological element for implementing a broad-band ISDN in recent years. The ATM is a method of segmenting user information in fixed-length transfer units referred to as cells, of about 50 bytes, then transmitting the cells to the destinations in a network that are specified in the address headers of the cells at high speeds. According to the ATM, and unlike conventional packet switching, information need not be temporarily placed in a memory but can be transferred at high speeds in cell units merely by interpreting the cell headers. A flow control, error recovery control, and other protocols are not implemented, permitting the high-speed transfer of cells.

The ATM, in which cells are allocated depending on the presence or absence of user information, permits communication at any transmission speed and facilitates efficiency in information transmission despite burst traffic. A unified information unit or cell is employed, helping thereby to achieve multimedia communication of diversely-formatted information effortlessly and economically.

2. Description of the Related Art

In a digital network, since signals are usually highly multiplexed, a fault in a signal affects a wide region of the network. Therefore, a transmission system or switching apparatus is designed to have a redundant configuration to ensure system reliability. The redundant configuration is made up of one spare unit or line for m current units or transmission lines. When a fault occurs in a unit or line, the unit or line is replaced with a spare. However, in a system for 10 providing complex and quick services over a digital network, a duplex standby configuration is usually adopted because of the ease by which it can be controlled.

In the duplex standby configuration, a spare system is placed in hot-standby state and operated in the same manner as a current system at all times. If a fault occurs in the current system, the data of both systems is compared in bits. This facilitates efficiency in fault detection. In the case of an occurrence of a fault, the current system is switched to the spare system instantaneously. This helps improve the reliability of a transmission system. In conventional transmission services since a continuous-bitstream oriented (CBO) service is provided, an information stream flows at a constant speed without fluctuation. In packet switching or synchronous transfer mode (STM), store-and-forward switching is performed using processors at end offices. Therefore, phase control and other supports can be provided at the end offices. Even if a phase lag is existent between information transmitted from the spare system and that from the current system, switching does not cause deterioration in information quality, such as duplication of signals or missing signals.

However, in an ATM transmission system, for example, user information is transferred in fixed-length blocks or cells, which are dynamically allocated in response to time-dependent, varying users' requests for information transmission. Therefore, even if quick switching is performed in a selector device, part of a cell-segmented signal is likely to be missing. In addition, since intervention of protocols in a transmission network is minimized to ensure the high-speed transfer of cells, a phase difference between spare and current systems cannot be easily removed. Not only does a missing cell-segmented signal occur but, also, a signal may be duplicated and transferred if the switching is done according to incorrect timing. This may change the contents of other cell data and cause a variety of unfavorable effects.

SUMMARY OF THE INVENTION

The principal object of the present invention is to solve the foregoing problems and provide an apparatus and method for non-stop switching in which a transmission line for transmitting statistically multiplexed cells can be switched from a current transmission line to a spare without causing momentary interruption.

Another object of the invention is to provide an apparatus and method for non-stop switching in which, even when a phase difference is existent between current and spare systems, the phase difference can be absorbed.

In accordance with the present invention, there is provided an apparatus for switching a current transmission line transmitting a series of statistically multiplexed information cells to a spare transmission line hot-standing-by, wherein the information cells transmitted in the current and spare transmission lines include empty cells that do not include user information. The apparatus also includes a detection means for detecting the empty cell and the current transmission line and the spare transmission line, a determination means for determining the timing for switching, based on the timing of the detection in the detection means, and a switching means for switching from the current transmission line to the spare transmission line base on the timing determined in the determination means.

In accordance with the present invention, there is also provided a method of switching a current transmission line transmitting a series of statistically multiplexed information cells to a spare transmission line hot-standing-by, wherein the information cells transmitted in the current and spare transmission lines include empty cells that do not include user information. This method includes the steps of detecting the empty cell in the current transmission line and the spare transmission line; determining the timing for the switching, based on the timing of the detection in the detection means, and switching the current transmission line to the spare transmission line based on the timing determined in the determining step.

DESCRIPTION OF THE PREFERRED EMBODIMENTS

Figure 1:
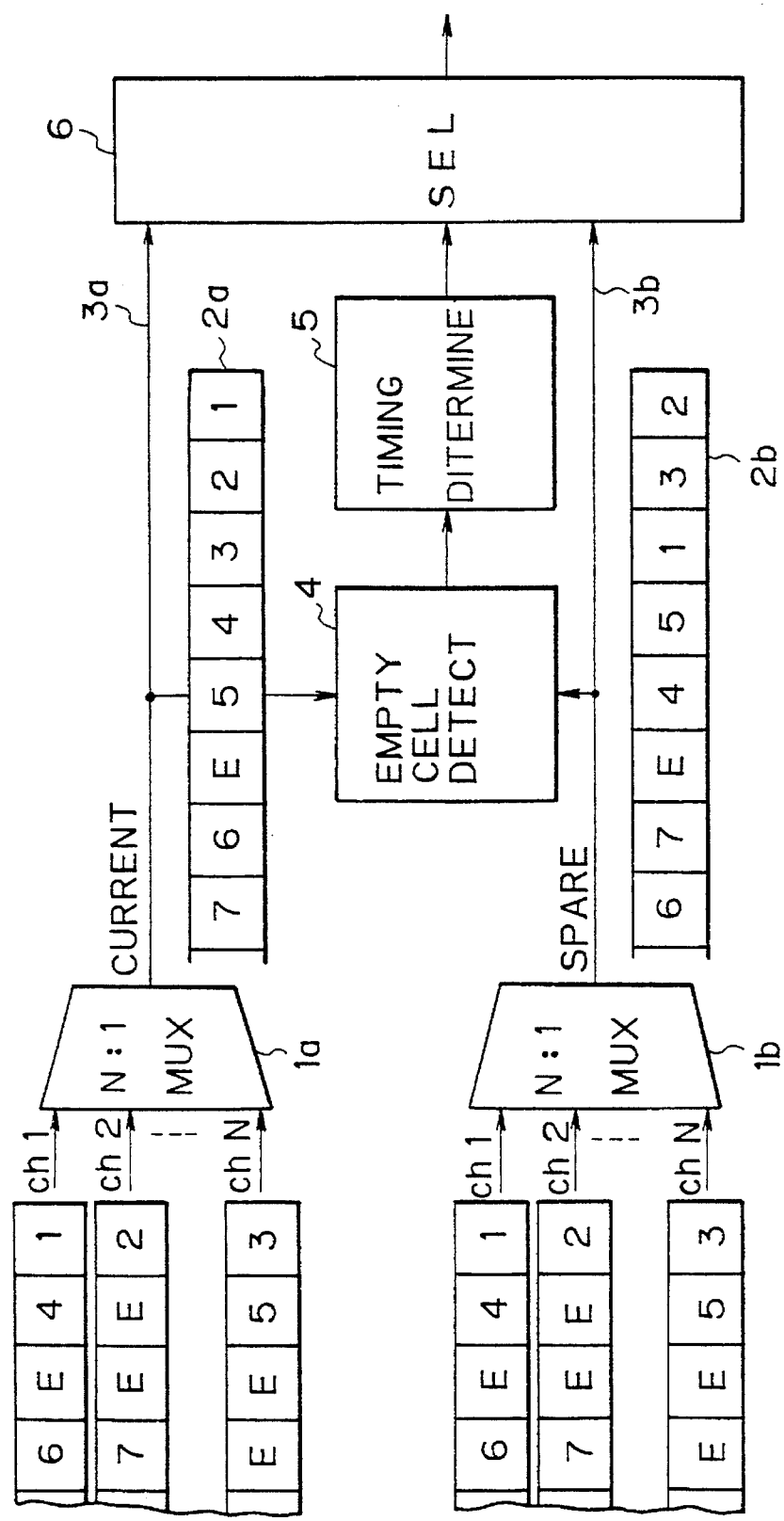
FIG. 1 is a diagram for explaining the principles of the present invention.

The principles of the present invention will be described in conjunction with FIG. 1. In FIG. 1, N channel signals transmitted in cells are statistically N-multiplexed in fixed-length cells by current and spare statistical multiplexers (hereafter, MUX) 1a and 1b, then transferred as serial cell data 2a and 2b over transmission lines 3a and 3b.

Thus, the series of cell data 2a and 2b are transmitted over the transmission lines 3a and 3b. Herein, information cells belonging to each channel, for example, information cells 1, 4, and 6 belonging to a channel 1 are transmitted in that order over the transmission lines 3a and 3b. This is true for both current and spare systems. However, information cells belonging to different channels, for example, information cell 1 of the channel 1 and information cell 2 of the channel 2 are transmitted in different orders between the current system and the spare system. This is because even though the spare system is operated in a hot-standby state, namely, operated under the same conditions as the current system, a slight difference of delay times caused by the difference of cable lengths alters the handling sequence when a congestion occurs among cells of different channels. This results in a different timing of fetching cells during statistical multiplexing. As a result, multiplexed cells are arranged in different orders between the current and spare systems.

Since a series of information cells is intentionally or unintentionally intermittent, it, consequently, contains empty cells denoted with "E"s. Empty cells do not include user information.

An empty cell detector 4 for detecting an empty cell signal detects the empty cell. A timing determination unit uses an empty cell detected by the empty cell signal detector 4 as a trigger and determines the timing for switching transmission lines 3a and 3b.

According to the switching timing, a selector (SEL) 6 switches a current transmission line 3a to a spare transmission line 3b, then outputs N-multiplexed serial cell data without causing momentary interruption.

Figure 2A:
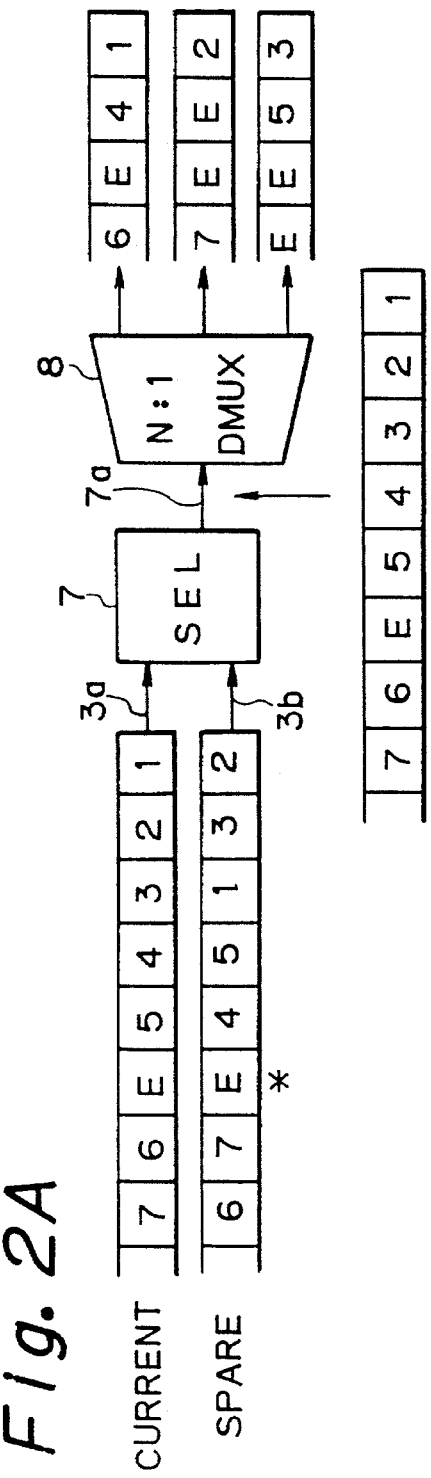
FIGS. 2A and 2B are diagrams showing switching timings in an apparatus for non-stop switching according to an embodiment of the present invention.
Figure 2B:
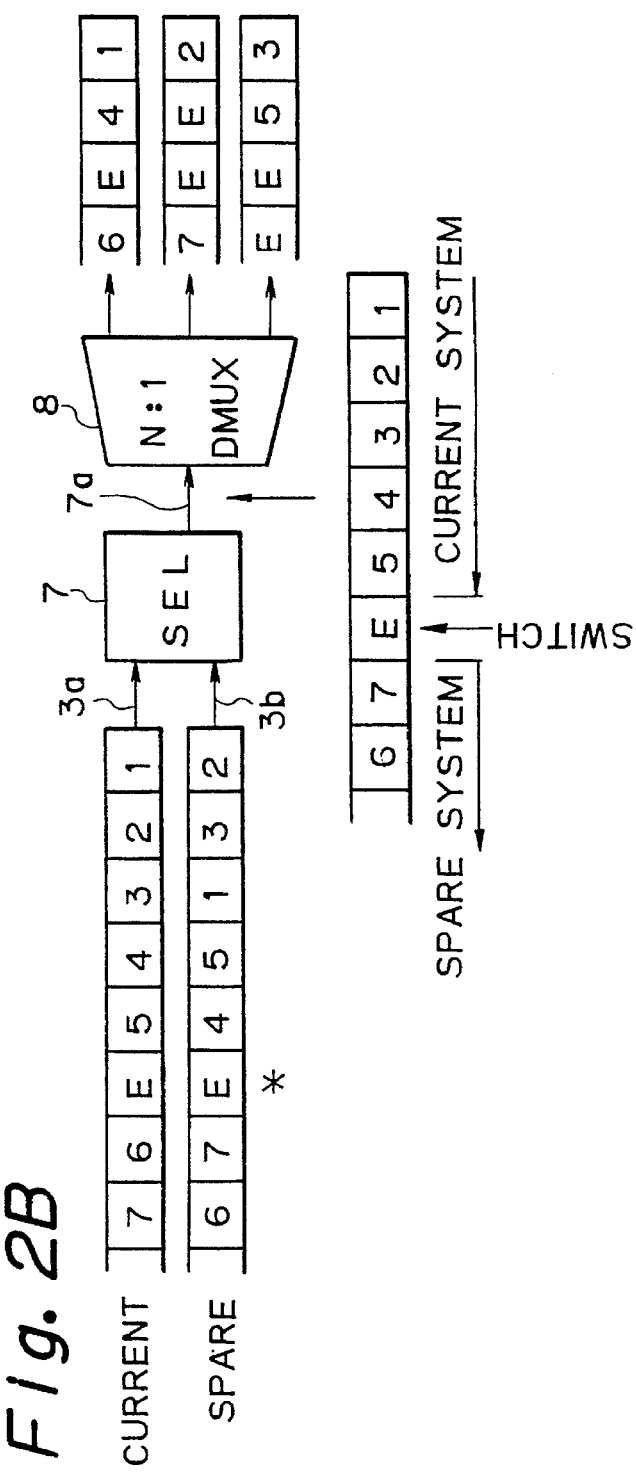

FIGS. 2A and 2B show the timing for switching input cell data from current cell data to spare cell data using a non-stop switching apparatus (hereafter, SEL) according to an embodiment of the present invention. In this case a time lag is not existent between the current system and spare system.

A non-stop switching apparatus 7 shown in FIGS. 2A and 2B function as the empty cell signal detector 4, the timing determination unit 5 and the SEL 6 shown in FIG. 1. In FIG. 2A, an output of a MUX 1a passes through a transmission line 3a, enters the SEL 7, then goes to an output line 7a of the SEL 7. Then, the output is separated into N channel signals by an N-channel demultiplexer (hereafter, DMUX) 8. On the other hand, as shown in FIG. 2B, if the current transmission line 3a is switched to a spare transmission line 3b, when empty cells are detected both in the current and spare systems, a series of cell data entering the DMUX 8 via the output line 7a of the SEL 7 is output as a separated channel signal similar to that provided during non-switching transmission.

Cell data in current and spare systems are fixed-length cell data with destination information added to the headers of the cells. If the traffic of cell data transferred in, for example, an ATM apparatus is about 70%, both the current and spare cell data arrays contain empty cells even after they are N-multiplexed by a multiplexer (hereafter, MUX). When no time lag is existent between the current and spare cell data arrays, an empty cell is expected to occur simultaneously in both current and spare systems, because the existence of an empty cell means no cell congestion. Therefore, both current and spare empty cells may be detected simultaneously according to a specific timing. The MUX outputs the input cell data on a first-in first-out basis. When cell data enters the current and spare systems in channels, a phase shift occurs. This results in a different orders of cells between the current transmission line 3a and spare transmission line 3b. However, The DMUX 8 identifies each cell data according to the destination information of the header, then reproduces a signal. Therefore, the difference in cell data allocation between both the transmission lines 3a and 3b poses no problem, as far as a spare system is concerned and the same cell data as those in a current system have already reached the SEL 7 before the empty cell data is output.

In this embodiment, current and spare systems are switched on boundaries of empty cell data. Therefore, cell data can be transmitted over the output line 7a of the SEL 7 without causing a duplicate or missing signal before and after switching. During switching, empty cell data is inserted to pad inter-cell time slots.

Figure 3:
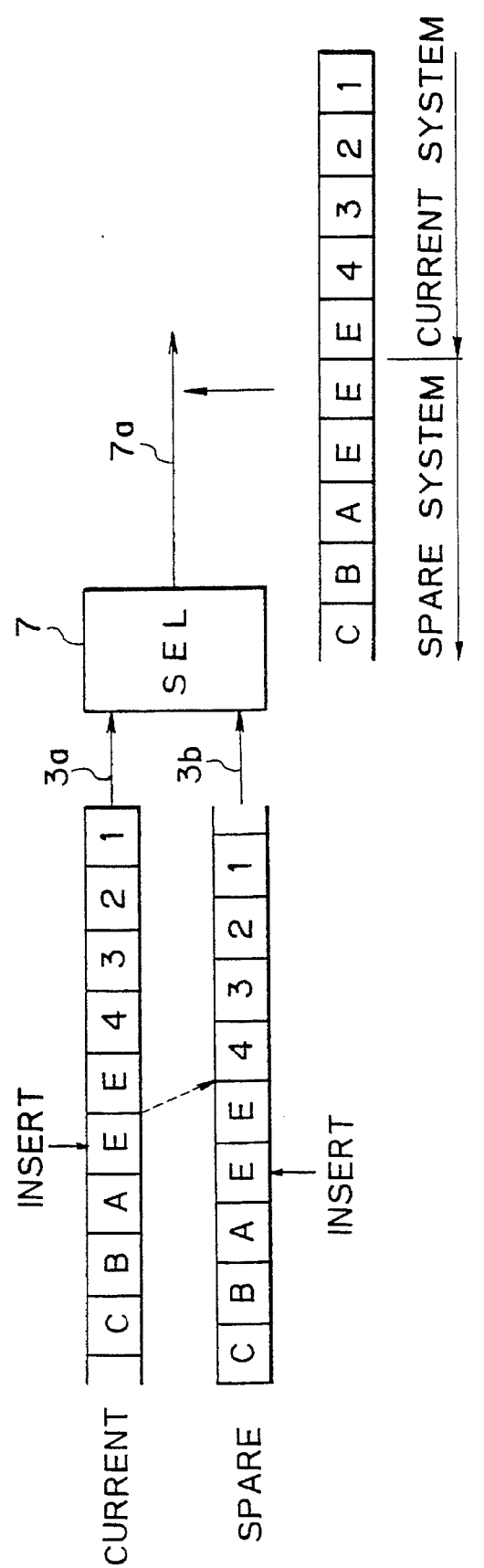
FIG. 3 is a diagram showing switching timing according to another embodiment of the present invention.
Figure 4:
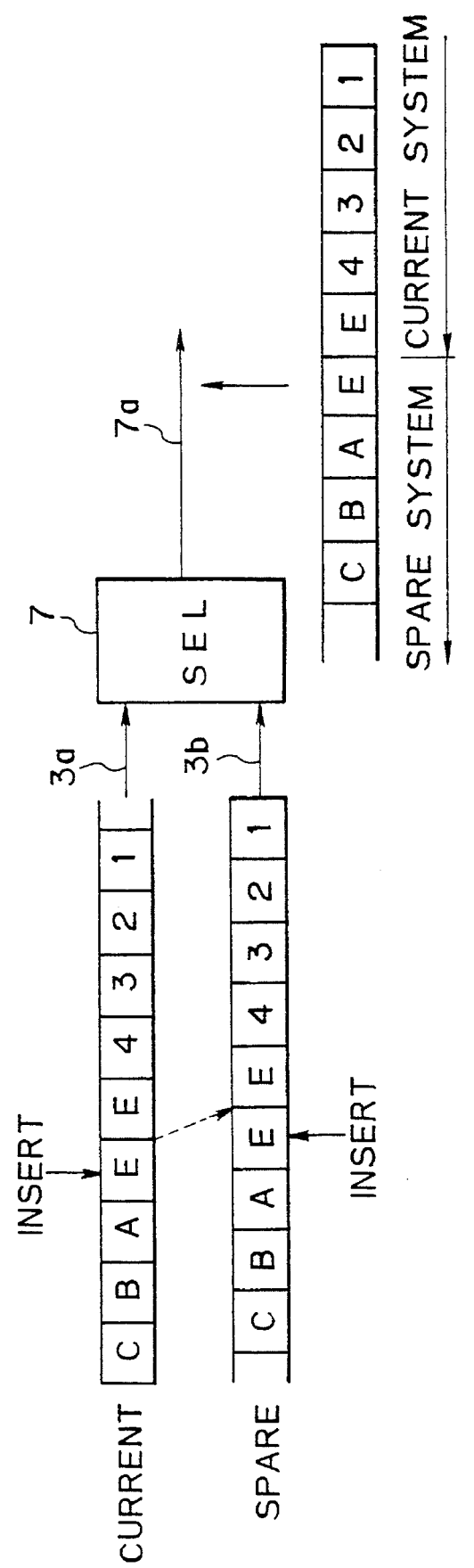
FIG. 4 is a diagram showing the timing for switching data in a series of cells in which a phase difference exists similar to FIG. 3.

FIGS. 3 and 4 show the timings for switching cell data in which a time lag exists. FIG. 3 shows transmission states before and after switching, wherein empty data is first detected in a cell on the current transmission line 3a. If empty cell data cannot be simultaneously detected in the current and spare transmission lines because of a time difference between the current and spare systems, the switching timing cannot be determined so that the SEL 7 will be switched on empty cell boundaries as described in FIG. 2. As shown in FIGS. 3 and 4, when an empty cell is detected either in the current system or in the spare system, another empty cell is inserted into the systems. Then, a temporary storage, such as a buffer memory, is installed in the SEL 7 to temporarily store the spare cell data immediately after an empty cell is detected in the cell data on either the current or spare transmission line. As shown in FIG. 3, if an empty cell is detected earlier in the current system, an empty cell going from the spare system to the SEL 7 is saved in the buffer temporarily. Then, the transmission lines are switched at the termination of an output of the empty cell data detected in the current cell data. The buffer outputs an empty cell when the transmission lines are switched. Thus, a phase difference between the transmission lines 3a and 3b is absorbed. Before and after switching, the SEL 7 outputs one empty cell from the current system and two empty cells from the spare system.

FIG. 4 shows transmission states before and after switching, wherein empty data is detected earlier in a cell on the spare transmission line 3b. In this case, an empty cell going from the spare system to the SEL 7 is saved temporarily in the buffer, then fed according to specific switching timing. Thus, a phase difference between the transmission lines 3a and 3b can be absorbed. Before and after switching, the SEL 7 outputs one empty cell from each of the current and spare systems.

Thus, after the phase difference between transmission lines 3a and 3b is absorbed, current and spare systems are switched on boundaries of empty cell data. Therefore, neither duplicate nor missing signals are generated before and after switching.

Figure 5:
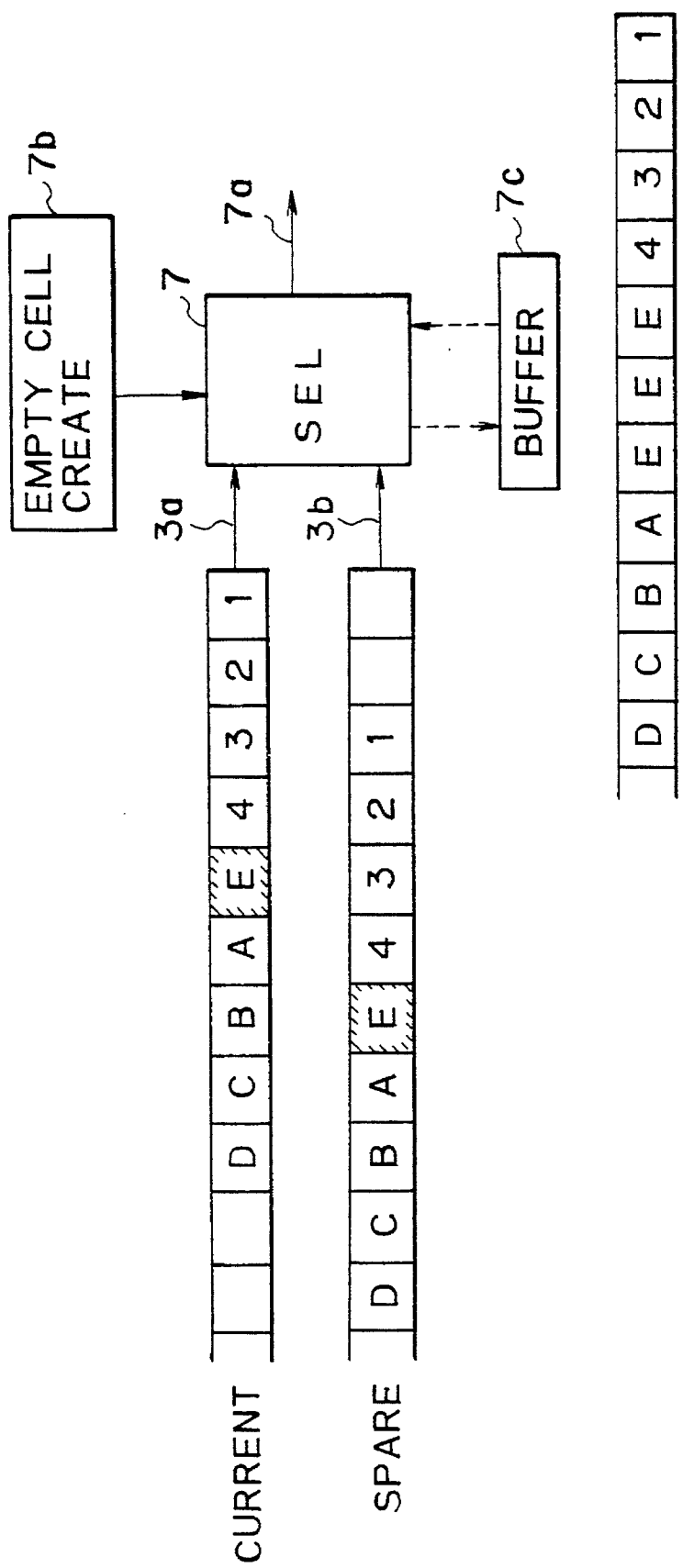
FIG. 5 is a diagram showing the timing for switching a series of cell data in which a phase difference longer than a unit cell transfer time is existent.
Figure 6:
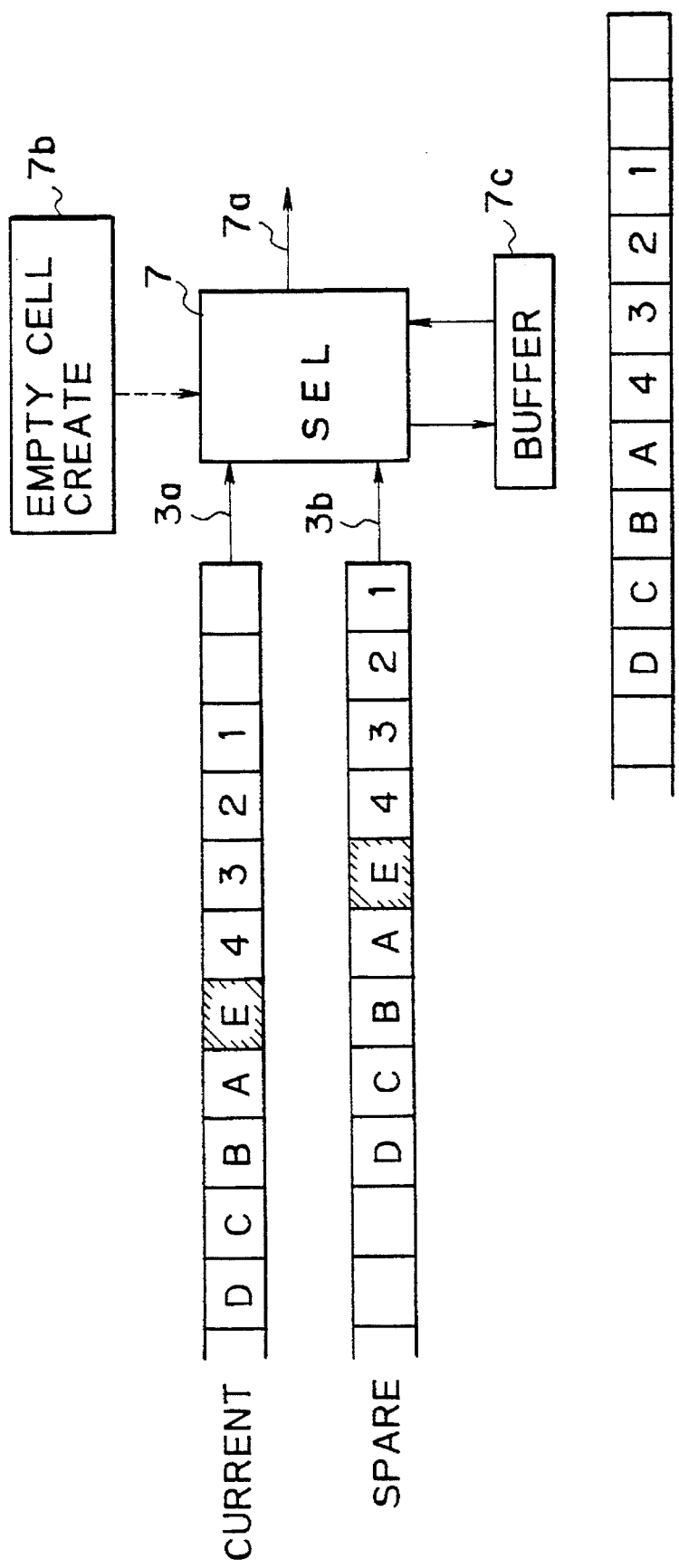
FIG. 6 is a diagram showing a timing for switching a series of cell data using a buffer under the same conditions as FIG. 5.

FIGS. 5 and 6 show the timing for switching a current system to a spare system, wherein a time difference between the current and spare systems is longer than the transfer time of a unit cell. In the transmission states before and after switching shown in FIG. 5, an empty cell is generated. In FIG. 6, a buffer is employed. In this case, a method described in conjunction with FIG. 3 such that the SEL 7 is switched at the termination of an output of empty cell data, cannot be adopted. Specifically, in FIG. 5, if a cell in the current transmission line 3a arrives at the SEL 7 earlier, cell data other than empty data cells, for example, data cells 3 and 4 on the spare transmission line 3b, are duplicated. Therefore, an empty cell generation means 7b is installed in the SEL 7, so that immediately after an empty cell is detected in cell data on the current transmission line 3a, a phase difference between the current and spare cell data arrays will be absorbed. In FIG. 6, a buffer 7c is employed, so that when an empty cell is first detected in cell data on the spare transmission line 3b, only effective information of the spare cell data will be stored temporarily and immediately after the detection.

Generally, it is unknown how far the phase of a cell data array is leading. To overcome this problem, a special empty cell or an empty cell having special information (shaded cells in FIGS. 5 and 6) is inserted for the current and spare systems at the transfer source associated with the transmission line.

As shown in FIG. 5, when a phase difference of at least one cell exists between current and spare systems and an empty cell is first detected on the current transmission line 3a, the empty cell generation means 7b outputs an empty cell immediately. Specifically, the current transmission line 3a is switched to the empty cell generation means 7b, then a signal is sent over the output line 7a of the SEL 7. After that, an empty cell detected on the spare transmission line 3b is used as a trigger. Then, the SEL 7 switches the empty cell generation means 7b to the spare transmission line and sends cell data over the output line 7a. Then, a phase difference is absorbed. Thus, if current and spare systems can be switched, a duplicate signal will not be generated before and after switching.

As shown in FIG. 6, when an empty cell is first detected on the spare transmission line 3b, the buffer 7c is activated immediately to store the spare cell data. After that, when an empty cell is detected in the current transmission line 3a, the empty cell is used as a trigger. Then, the SEL 7 transmits the cell data from the spare transmission line to the output line 7a via the buffer 7c. Thus, a phase difference is absorbed. At this time, only effective data in the spare system is stored in the buffer 7c. When an empty cell reaches the SEL 7 after that, the effective information in the buffer 7c is cleared to 0s.

In the aforesaid description, cell data 2a and 2b transferred between MUXs 1a, 1b and a DMUX 8 as an example of signals to be transmitted in cells are described as switched data. The present invention can apply to other processing systems dealing with signals containing empty cells. A supervisory cell for the internal use of a processing system may be inserted into the cell data on current and spare digital transmission lines intentionally instead of empty cell data. This also permits non-stop switching. Assuming that the current system is recovered from a fault state after temporarily switching the current transmission line to the spare transmission line, the spare system can be non-stop switched to the current system.

As described above, an apparatus for non-stop switching according to the present invention uses empty cells detected in current and spare cell data as a trigger, then determines a transmission line switching timing. Therefore, a current signal being transferred at high speed can be switched to a spare one without causing a missing or duplicate cell-segmented signal.

Even when a phase difference exists between current and spare cells being transmitted, the transmission lines can be switched with the phase difference absorbed perfectly.

We claim:

1. An apparatus for switching a current transmission line to a spare transmission line, said apparatus comprising:

a current statistical multiplexer, included in the current transmission line, for producing a first sequence of information cells;

a spare statistical multiplexer, included in the spare transmission line, for producing a second sequence of information cells, the first and second sequences of information cells being generated by statistically multiplexing channel signals;

detection means for detecting empty cells in the first and second sequences, determination means for determining timing for switching, based on timing of the empty cells detected in the detection means; and switching means for switching the current transmission line to the spare transmission line at the timing determined in the determination means.

2. An apparatus as claimed in claim 1, wherein the detection means detects empty cells simultaneously transmitted both in the current and the spare transmission lines, and the determination means determines the timing for switching when the empty cells simultaneously transmitted are detected by the detection means.

3. An apparatus as claimed in claim 1, further comprising:

first inserting means for inserting an empty cell into the first sequence of information cells when one of the empty cells is detected in the current transmission line by the detection means;

second inserting means for inserting an empty cell into the second sequence of information cells when one of the empty cells is detected in the spare transmission line by the detection means; and storing means for storing the empty cell of the spare transmission line after the one of the empty cells is detected either in the current transmission line or in the spare transmission line;

wherein the determination means determines the timing for switching after the one of the empty cells detected in the current transmission line has been transmitted.

4. An apparatus as claimed in claim 1, further comprising:

empty cell creating means for creating the empty cells after one of the empty cells is detected in the current transmission line and before one of the empty cells is detected in the spare transmission line;

wherein the determination means determines the timing for switching when the one of the empty cells is detected in the spare transmission line.

5. An apparatus as claimed in claim 1, further comprising:

storing means for storing the second sequence of information cells transmitted after one of the empty cells is detected in the spare transmission line and before one of the empty cells is detected in the current transmission lines;

wherein the determination means determines the timing for switching when the one of the empty cells is detected in the current transmission line.

6. A method of switching a current transmission line to a spare transmission line, said method comprising the steps of:

producing a first sequence of information cells by a current statistical multiplexer included in the current transmission line by statistically multiplexing channel signals;

producing a second sequence of information cells by a spare statistical multiplexer included in the spare transmission line by statistically multiplexing channel signals;

detecting empty cells in the first and second sequences;

determining timing for switching, based on timing of the empty cells detected in the detecting step; and switching the current transmission line to the spare transmission line at the timing determined in the determining step.

7. A method as claimed in claim 6, wherein in the detecting step, the empty cells simultaneously transmitted both in the current and the spare transmission lines are detected, and in the determining step, switching when the empty cells simultaneously transmitted are detected in the detecting step.

8. A method as claimed in claim 6, further comprising the steps of:

inserting an empty cell into the first sequence of information cells when one of the empty cells is detected in the current transmission line in the detecting step;

inserting an empty cell into the second sequence of information cells when the one of the empty cells is detected in the spare transmission line in the detecting step; and storing the one of the empty cells of the spare transmission line after the empty cell is detected either in the current transmission line or in the spare transmission line;

wherein in the determining step, switching after the one of the empty cells detected in the current transmission line has been transmitted.

9. A method as claimed in claim 6, further comprising the step of:

creating empty cells after one of the empty cells is detected in the current transmission line and before the one of the empty cells is detected in the spare transmission line;

wherein in the determining step, switching when the one of the empty cells is detected in the spare transmission line.

10. A method as claimed in claim 6, further comprising the steps of:

storing the second sequence of information cells transmitted after one of the empty cells is detected in the spare transmission line and before the one of the empty cells is detected in the current transmission lines; and wherein in the determining step switching when the one of the empty cells is detected in the current transmission line.

* * * * *

UNITED STATES PATENT AND TRADEMARK OFFICE
CERTIFICATE OF CORRECTION

PATENT NO. : 5,475,675
DATED : December 12, 1995
INVENTOR(S) : Ryuichi KONDO et al.

It is certified that error appears in the above-indentified patent and that said Letters Patent is hereby corrected as shown below:

Column 1, line 33, change "unit" to --unit,--,
and change "cell" to --cell,--;
line 46, delete "10".

Column 2, line 36, after "and" insert --in--;
line 40, change "base" to --based--.

Column 3, line 5, change "a" (second occurrence) to --the--;
line 54, change "case" to --case,--;
line 57, change "function" to --functions--.

Signed and Sealed this

Twenty-third Day of April, 1996

Attest:

BRUCE LEHMAN

Attesting Officer

Commissioner of Patents and Trademarks